UNITED STATES PATENT OFFICE.

JAMES TURNER, OF CHICAGO, ILLINOIS.

IMPROVEMENT IN PROCESSES OF PRESERVING MEAT.

Specification forming part of Letters Patent No. 221,708, dated November 18, 1879; application filed March 19, 1877.

*To all whom it may concern:*

Be it known that I, JAMES TURNER, of the city of Chicago, Cook county, State of Illinois, have invented a new and useful Improvement in Processes for Preserving Fresh Meat, of which the following is a full description.

My improvement is primarily designed to be used in canning fresh meats.

In preparing such meats for canning it is customary to first put the meat into a mild pickle, allowing it to stand therein only long enough to become sufficiently seasoned, during which process the meat absorbs considerable water, which unites with the watery particles in the meat. This water ought to be removed, and for this purpose pressure has been applied to the meat; but if the pressure is applied to the meat in the condition in which it is when taken from the pickle, the pressure will remove but a very small percentage of the water.

The object of my improvement is to secure the removal of a large percentage of the water, which I accomplish by submitting the meat to the action of scalding water after it has been taken from the pickle, and then submitting it to pressure.

My process is as follows: I first put the meat into a mild pickle, permitting it to stand therein long enough to become sufficiently seasoned—say from twenty-four to forty-eight hours, according to circumstances; then I remove the meat from the pickle and put it into scalding water, allowing it to stand therein long enough to become heated through—say from five to ten minutes—the effect of which scalding is to bring the meat into such condition that all, or nearly all, of the absorbed water and a large percentage of the water originally in the meat can be removed by pressure. I then remove the meat from the scalding-bath and submit it to suitable pressure, and thereby remove the absorbed water and a large per cent. of the water originally in the meat. I then place the meat in cans and cook it, and seal the cans in the usual manner.

What I claim as new, and desire to secure by Letters Patent, is as follows:

The process herein described of preserving meat, which consists in first putting the meat into a pickle, then immersing it in a scalding-bath, then submitting the same to pressure to remove the water, then putting into cans, and cooking and sealing, substantially as specified.

JAMES TURNER.

Witnesses:
O. W. BOND,
H. F. BRUNS.